(12) United States Patent
Min et al.

(10) Patent No.: US 12,024,817 B2
(45) Date of Patent: Jul. 2, 2024

(54) ARTIFICIAL LEATHER HAVING EXCELLENT SURFACE APPEARANCE AND METHOD OF MANUFACTURING THE SAME

(71) Applicant: LG HAUSYS, LTD., Seoul (KR)

(72) Inventors: Chul Hee Min, Seoul (KR); Yongbae Jung, Seoul (KR); Inhyuk Lee, Seoul (KR)

(73) Assignee: LG Hausys, Ltd., Seoul (KR)

( * ) Notice: Subject to any disclaimer, the term of this patent is extended or adjusted under 35 U.S.C. 154(b) by 623 days.

(21) Appl. No.: 16/641,956

(22) PCT Filed: Sep. 11, 2018

(86) PCT No.: PCT/KR2018/010649
§ 371 (c)(1),
(2) Date: Feb. 25, 2020

(87) PCT Pub. No.: WO2019/054731
PCT Pub. Date: Mar. 21, 2019

(65) Prior Publication Data
US 2020/0232157 A1      Jul. 23, 2020

(30) Foreign Application Priority Data

Sep. 14, 2017  (KR) .................. 10-2017-0117553
Nov. 24, 2017  (KR) .................. 10-2017-0158854
Aug. 22, 2018  (KR) .................. 10-2018-0098244

(51) Int. Cl.
*D06N 3/00*   (2006.01)
*B60N 2/58*   (2006.01)
*D06N 3/06*   (2006.01)

(52) U.S. Cl.
CPC ............. *D06N 3/0077* (2013.01); *B60N 2/58* (2013.01); *D06N 3/06* (2013.01); *D10B 2505/12* (2013.01)

(58) Field of Classification Search
CPC .... D06N 3/0077; D06N 3/005; D06N 3/0079; D06N 3/0006; D06N 3/0011; D06N 3/0043–0054
See application file for complete search history.

(56) References Cited

U.S. PATENT DOCUMENTS

| 7,378,143 | B2* | 5/2008 | Schneider | ........... B32B 37/0007 428/161 |
| 2018/0099594 | A1* | 4/2018 | Min | ........................ B32B 5/02 |
| 2018/0281364 | A1* | 10/2018 | Uemura | .................. B32B 27/20 |

FOREIGN PATENT DOCUMENTS

| CN | 85104486 A | * 12/1986 |
| CN | 87 1 05970 A | 8/1988 |

(Continued)

OTHER PUBLICATIONS

"CN85104486_Machine Translation" is a machine translation of CN-85104486-A. (Year: 1986).*

(Continued)

*Primary Examiner* — Larissa Rowe Emrich
(74) *Attorney, Agent, or Firm* — Bryan Cave Leighton Paisner LLP (57) ABSTRACT

The present invention relates to artificial leather, and more particularly, to artificial leather for automobile seat covers having excellent surface appearance and a method of manufacturing the artificial leather. When the artificial leather of the present invention is manufactured, surface treatment is performed before embossing molding that imparts a texture and cushioning similar to natural leather to artificial leather. Accordingly, the artificial leather of the present invention may be provided with a surface treatment layer having a uniform thickness, thereby exhibiting excellent surface appearance.

5 Claims, 4 Drawing Sheets

(56) References Cited

FOREIGN PATENT DOCUMENTS

| | | | |
|---|---|---|---|
| CN | 102517915 A | | 6/2012 |
| CN | 102582075 A | | 7/2012 |
| CN | 105568699 A | | 5/2016 |
| CN | 106702753 A | * | 5/2017 |
| CN | 106702753 A | | 5/2017 |
| JP | H093783 A | * | 1/1997 |
| JP | 2012127010 A | | 7/2012 |
| KR | 20030006258 A | * | 1/2003 |
| KR | 100540191 B1 | | 1/2006 |
| KR | 20090078185 A | * | 7/2009 |
| KR | 1020090078185 A | | 7/2009 |
| KR | 1020130130224 A | | 12/2013 |
| KR | 101361535 B1 | | 2/2014 |
| KR | 10-2016-0090969 A | | 8/2016 |
| KR | 1020170018580 A | | 2/2017 |
| WO | 2017061611 A1 | | 4/2017 |
| WO | WO-2017061611 A1 * | 4/2017 | ........... B29C 43/003 |

OTHER PUBLICATIONS

"JPH093783_Machine Translation" is a machine translation of JP-H093783-A. (Year: 1997).*
"KR20090078185_Machine Translation" is a machine translation of KR-20090078185-A. (Year: 2009).*
"CN106702753_Machine Translation" is a machine translation of CN-106702753-A. (Year: 2017).*
"KR20030006258_Machine Translation" is a machine translation of KR-20030006258-A, (Year: 2003).*
"Leather Analysis and Testing", compiled by Leather Research Laboratory of Northwest Institute of Light Industry, published by China Light Industry Press, version 1, publication date: Jul. 31, 1996.Chapter 10: Measurement (applicable to heavy leather) for Hardness, Plasticity and Deformation Recovery Rate (pp. 631-633).
"Synthetic Leather Chemicals", written by Tantan Qiang, published by China Light Industry Press, version 1, publication date: Jul. 31, 2016; (pp. 230-235).

* cited by examiner

ARTIFICIAL LEATHER HAVING EXCELLENT SURFACE APPEARANCE AND METHOD OF MANUFACTURING THE SAME

This application is a National Stage Entry of International Application No. PCT/KR2018/010649, filed on Sep. 11, 2018, and claims the benefit of and priority to Korean Application No. 10-2017-0117553, filed on Sep. 14, 2017, and Korean Application No. 10-2017-0158854, filed on Nov. 24, 2017, and Korean Application No. 10-2018-0098244, filed Aug. 22, 2018 all of which are hereby incorporated by reference in their entirety for all purposes as if fully set forth herein.

TECHNICAL FIELD

The present invention relates to artificial leather, and more particularly, to artificial leather for automobile seat covers having excellent surface appearance and a method of manufacturing the artificial leather. When the artificial leather of the present invention is manufactured, surface treatment is performed before embossing molding that imparts a texture and cushioning similar to natural leather to artificial leather. Accordingly, the artificial leather of the present invention may be provided with a surface treatment layer having a uniform thickness, thereby exhibiting excellent surface appearance.

BACKGROUND ART

In general, the inside of an automobile is considered as a second home. In recent years, as demand for a pleasant and comfortable driving environment in automobiles have increased, functional seats are attracting considerable attention.

Efforts have been made to develop artificial leather such as polyvinyl chloride leather and polyurethane leather, as an automobile seat material, that can satisfy the aesthetics and functionality of natural leather at a low cost.

Specifically, conventional artificial leather has a structure in which a back layer, a foam layer, a skin layer, and a surface treatment layer are laminated from the bottom to the top.

In particular, to impart a texture and cushioning similar to natural leather to the upper surface of a skin layer, as described in KR 10-1361535 B1 (Publication date: Feb. 13, 2014), an embossed pattern is formed on the skin layer using roller pressing, i.e., artificial leather is passed between embossing rollers so that the embossed pattern is transferred to the skin layer.

Thereafter, a surface treatment agent is applied to the upper surface of the skin layer, on which the embossed pattern has been formed, to form a surface treatment layer. In this case, the amounts of the surface treatment agent applied to the valleys and crests of the embossed pattern are quite different, leading to formation of a non-uniform thickness surface treatment layer. As a result, gloss difference in the valleys and the crests may occur, and thus the valleys or the crests may be brighter than other areas. Accordingly, the manufactured artificial leather may look mottled.

RELATED ART DOCUMENTS

Patent Documents (Patent Document 1) KR 10-1361535 B1 (Publication date: Feb. 13, 2014)

DISCLOSURE

Technical Problem

Therefore, the present invention has been made in view of the above problems, and it is one object of the present invention to provide artificial leather having excellent surface appearance.

It is another object of the present invention to provide a method of manufacturing artificial leather, wherein surface treatment is performed before embossing molding.

Technical Solution

In accordance with one aspect of the present invention, provided is artificial leather, wherein a ratio of thickness of a portion of a surface treatment layer formed on a crest of an embossed pattern to thickness of a portion of the surface treatment layer formed on a valley of the embossed pattern is 0.7 to 1.

In accordance with another aspect of the present invention, provided is a method of manufacturing artificial leather, including:
- step S1 of coating one surface of a back layer formed of woven fabric or nonwoven fabric with a coating solution;
- step S3 of separately forming a pre-foam layer or foam layer and a skin layer by molding;
- step S5 of laminating the back layer having one coated surface on a lower surface of the pre-foam layer or foam layer;
- step S7 of laminating the skin layer on an upper surface of the pre-foam layer or foam layer on which the back layer has been formed;
- step S9 of coating an upper surface of the skin layer with a water-based surface treatment agent to form a surface treatment layer;
- step S11 of irradiating an upper surface of the surface treatment layer with infrared light; and
- step S13 of forming an embossed pattern through vacuum adsorption molding on upper surfaces of the skin layer and surface treatment layer heated by irradiation with infrared light.

Advantageous Effects

In artificial leather of the present invention, the thicknesses of portions of a surface treatment layer respectively formed on a valley and a crest of an embossed pattern are uniform. Accordingly, artificial leather having excellent appearance can be provided.

In addition, the artificial leather of the present invention has a texture similar to that of natural leather and has a soft feel similar to natural leather.

In addition, the artificial leather of the present invention can implement excellent cushioning by preventing foam cells constituting foam layers from being distorted or damaged.

BEST MODE

Hereinafter, the functions or constructions of preferred embodiments of the present invention will now be described more fully with reference to the accompanying drawings.

Here, when reference numerals are applied to constituents illustrated in each drawing, it should be noted that like reference numerals indicate like elements throughout the specification.

Figure 1:
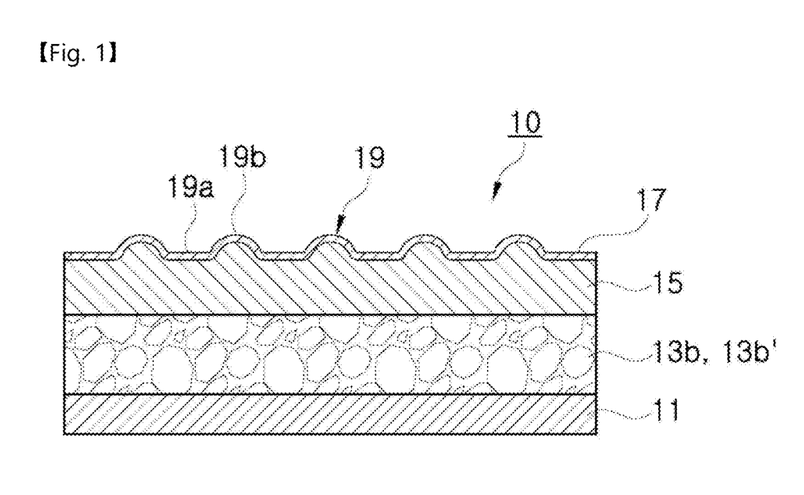
FIG. 1 is a side cross-sectional view of artificial leather of the present invention, showing a laminated structure thereof.

FIG. 1 is a side cross-sectional view of artificial leather of the present invention, showing the laminated structure thereof. Artificial leather 10 of the present invention may include a back layer 11, foam layers 13b and 13b', a skin layer 15, and a surface treatment layer 17, which are laminated from the bottom to the top. In this case, an embossed pattern 19 may be formed on upper surfaces of the skin layer 15 and the surface treatment layer 17.

Specifically, in the artificial leather 10 of the present invention, a ratio of the thickness of a portion of the surface treatment layer formed on each of crests 19b of the embossed pattern 19 to the thickness of a portion of the surface treatment layer formed on each of valleys 19a of the embossed pattern 19 (i.e., the thickness of a portion of the surface treatment layer formed on a crest÷the thickness of a portion of the surface treatment layer formed on a valley) may be 0.7 to 1 or 0.8 to 1. Within this range, since difference in gloss in portions of the surface treatment layer respectively formed on each valley and each crest is small, a surface does not appear mottled. Accordingly, artificial leather having excellent appearance may be provided.

Figure 3:
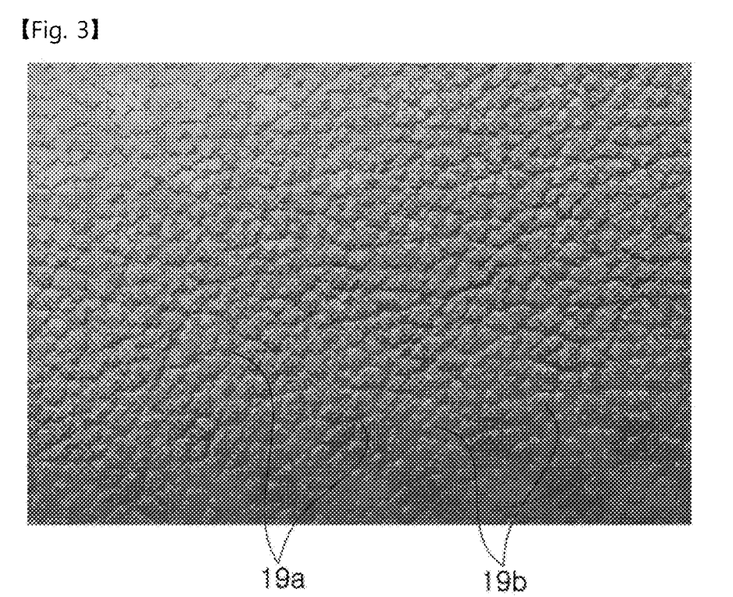
FIG. 3 is an image showing the surface (embossed pattern) of artificial leather of the present invention.

In the present invention, the valley of the embossed pattern refers to a depression (凹) of prominences and depressions (凹凸), i.e., the lowest point, and the crest of the embossed pattern refers to a prominence (凸), i.e., the highest point (see FIG. 3).

When the thickness ratio between portions of the surface treatment layer respectively formed on each valley 19a and each crest 19b of the embossed pattern 19 is measured, an artificial leather 10 is cut in the vertical direction, and the thickness of the surface treatment layer is measured using a high magnification optical microscope. Then, the thickness ratio is calculated by a formula of the thickness of a portion of the surface treatment layer formed on a crest/the thickness of a portion of the surface treatment layer formed on a valley.

In addition, in the artificial leather 10 of the present invention, the thickness difference between portions of the surface treatment layer respectively formed on each valley 19a and each crest 19b of the embossed pattern 19 may be less than 5 μm, or 3 μm or less. Within this range, since difference in gloss in portions of the surface treatment layer respectively formed on each of the valleys 19a and each of the crests 19b is small, a surface does not appear mottled. Accordingly, artificial leather having excellent appearance may be provided.

Specifically, in the case of conventional artificial leather in which an embossed pattern is formed through molding using a roller pressing-type embossing roller, to prevent a surface treatment layer from being damaged, a surface treatment agent should be applied after embossing molding. Accordingly, the thickness difference between portions of the surface treatment layer respectively formed on each valley 19a and each crest 19b of the embossed pattern 19 is 5 μm or more, and gloss difference in portions of the surface treatment layer respectively formed on each valley 19a and each crest 19b is large. Thus, appearance quality may be degraded. On the other hand, in the case of the artificial leather 10 of the present invention, surface treatment may be performed before the embossed pattern 19 is formed through molding. Accordingly, the thicknesses of portions of the surface treatment layer respectively formed on the valleys 19a and the crests 19b of the embossed pattern 19 may be uniform. Thus, artificial leather having excellent appearance may be provided.

Areas where the thickness difference or thickness ratio between portions of the surface treatment layer respectively formed on each valley 19a and each crest 19b of the embossed pattern 19 satisfies the above range may occupy 80% or more or 90% or more of the total surface of the artificial leather.

More specifically, in the artificial leather 10 of the present invention, as described above, the thickness difference between portions of the surface treatment layer respectively formed on each valley 19a and each crest 19b of the embossed pattern 19 is less than 5 μm. In addition, there is no difference in gloss in the valleys 19a and the crests 19b of the embossed pattern 19.

When gloss difference is evaluated, an artificial leather specimen is exposed to light having a wavelength of 380 to 800 nm, the artificial leather specimen is inclined at an angle of 30 to 60° based on the direction of the incident light, and whether there is gloss difference in the valleys 19a and the crests 19b of the embossed pattern 19 is determined by visual observation based on difference in reflectivity. Then, visual assessment is expressed in qualitative values.

More specifically, gloss difference is evaluated based on the opinions of a panel consisting of 10 evaluators. The evaluators are asked whether there is difference in gloss of the valleys 19a and crests 19b of the embossed pattern 19 of an artificial leather specimen. When five or more evaluators say there is difference in gloss, it is evaluated that there is difference in gloss, which is marked by "X (poor appearance)". When less than five evaluators say there is difference in gloss, it is evaluated that there is no difference in gloss, which is marked by "○ (excellent appearance)".

When measuring whether there is difference in gloss of the valleys 19a and crests 19b of the embossed pattern 19 of an artificial leather specimen, the position of the artificial leather specimen is adjusted so that the direction of light (light source) is perpendicular to the artificial leather specimen and an evaluator's line of sight. In this case, the artificial leather specimen is placed parallel to the evaluator's line of sight.

Figure 4:
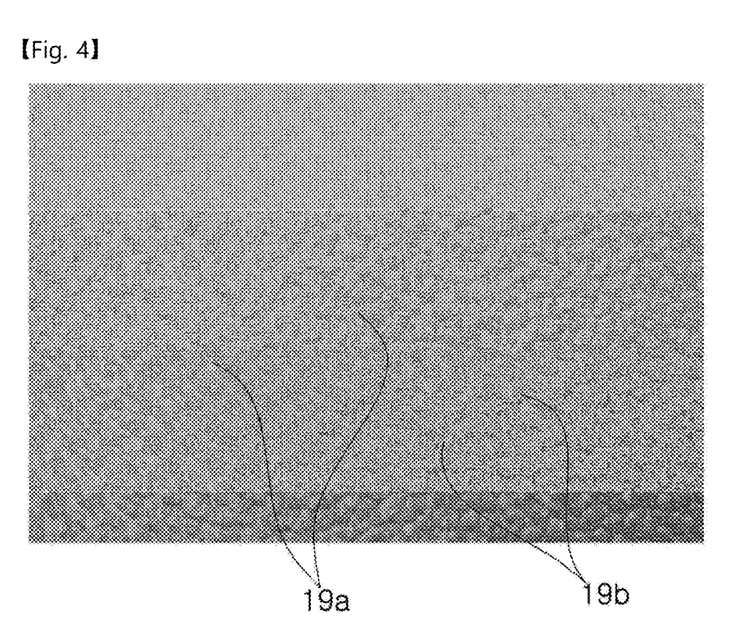
FIG. 4 is an image showing the surface (embossed pattern) of artificial leather manufactured using a conventional method, wherein an embossed pattern is formed through roller pressing, and then a surface treatment agent is applied.
Figure 5:
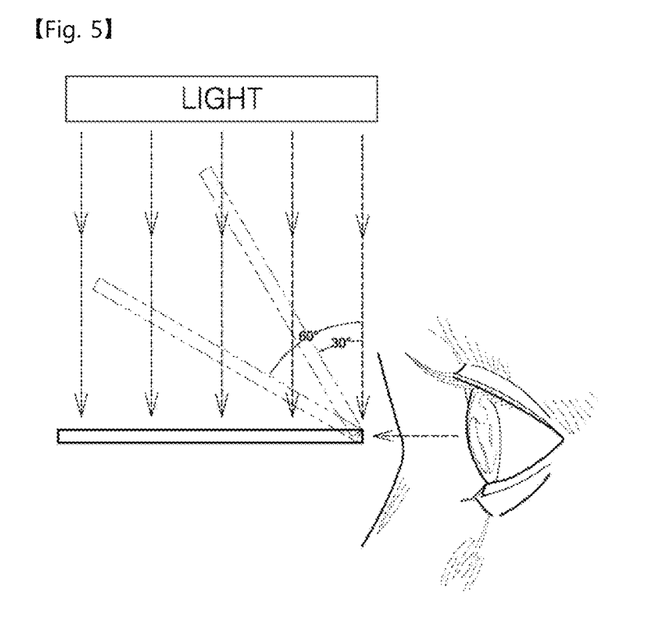
FIG. 5 is a drawing for explaining a method of measuring the surface gloss difference of artificial leather.

Thereafter, as shown in FIGS. 3 and 4, while repeatedly tilting the artificial leather specimen at 30 to 60° based on incident light, it is evaluated whether there is gloss difference based on the valleys 19a of the embossed pattern 19 (see FIG. 5).

In addition, when evaluating difference in gloss, the distance between an artificial leather specimen and the evaluator's eye may be 30 cm or less, or 20 cm or less. When the distance exceeds the above range, it is difficult to evaluate difference in gloss of the valleys 19a and the crests 19b of the embossed pattern 19, and only the overall gloss of the artificial leather specimen may be visually recognized. Thus, evaluation of gloss difference is preferably performed within the above distance.

In addition, in the case of the artificial leather 10 of the present invention, since surface treatment may be performed before embossing molding, a surface treatment layer and an embossed pattern are simultaneously processed during embossing molding, and thus illumination (Ra) may be increased by the embossed pattern. In the case of conventional artificial leather, in which an embossed pattern is formed through molding using a roller pressing-type embossing roller, when a surface treatment agent is applied after embossing molding, the amount of the surface treatment agent applied to the valleys of the embossed pattern is more than that applied to the crests of the embossed pattern, and thus the surface of artificial leather is somewhat flattened. Accordingly, illumination (Ra) of the conventional artificial leather may be lower than that of the artificial leather 10 of the present invention.

In addition, the artificial leather 10 of the present invention may have a microhardness of 45 to 59 or 50 to 57.

The microhardness refers to a local hardness for a microscopic specimen having a thickness of approximately 0.5 to 1.5 mm. The microhardness is a maximum value measured immediately after a needle is brought into contact with the artificial leather at an indentation speed of 1 mm/s in a peak hold mode using a microhardness tester (Micro durometer, Model name: MD-1 capa, Brand: ASKER), i.e., when the load holding time of the needle is 1 second.

Specifically, hardness may be measured using various methods, e.g., a Shore Hardness (SH) test, a Rock Hardness (RH) test, a Vickers Hardness (VH) test, a Knoop Hardness (KH) test, and a microhardness test. Thereamong, the Shore Hardness test is most commonly used when measuring the hardness of artificial leather.

However, the Shore Hardness test is a method of measuring the hardness of specimens having a thickness of 5 mm or more, and thus is not suitable for measuring microscopic specimens having a thickness of less than 5 mm.

The microhardness test is a method of measuring the hardness of specimens having a thickness of less than 5 mm, e.g., microscopic specimens having a thickness of 0.5 to 1.5 mm, and may be performed using a microhardness tester, e.g., Micro Durometer (Model name: MD-1 capa, Brand: ASKER).

In the present invention, when microhardness exceeds the above range, it is difficult to realize a soft feel. When microhardness is below the above range, mechanical properties such as wear resistance may be degraded. Accordingly, to realize a soft feel and excellent cushioning, the artificial leather of the present invention preferably has a microhardness within the above range.

In addition, a method of manufacturing the artificial leather 10 is described as follows.

Figure 2:
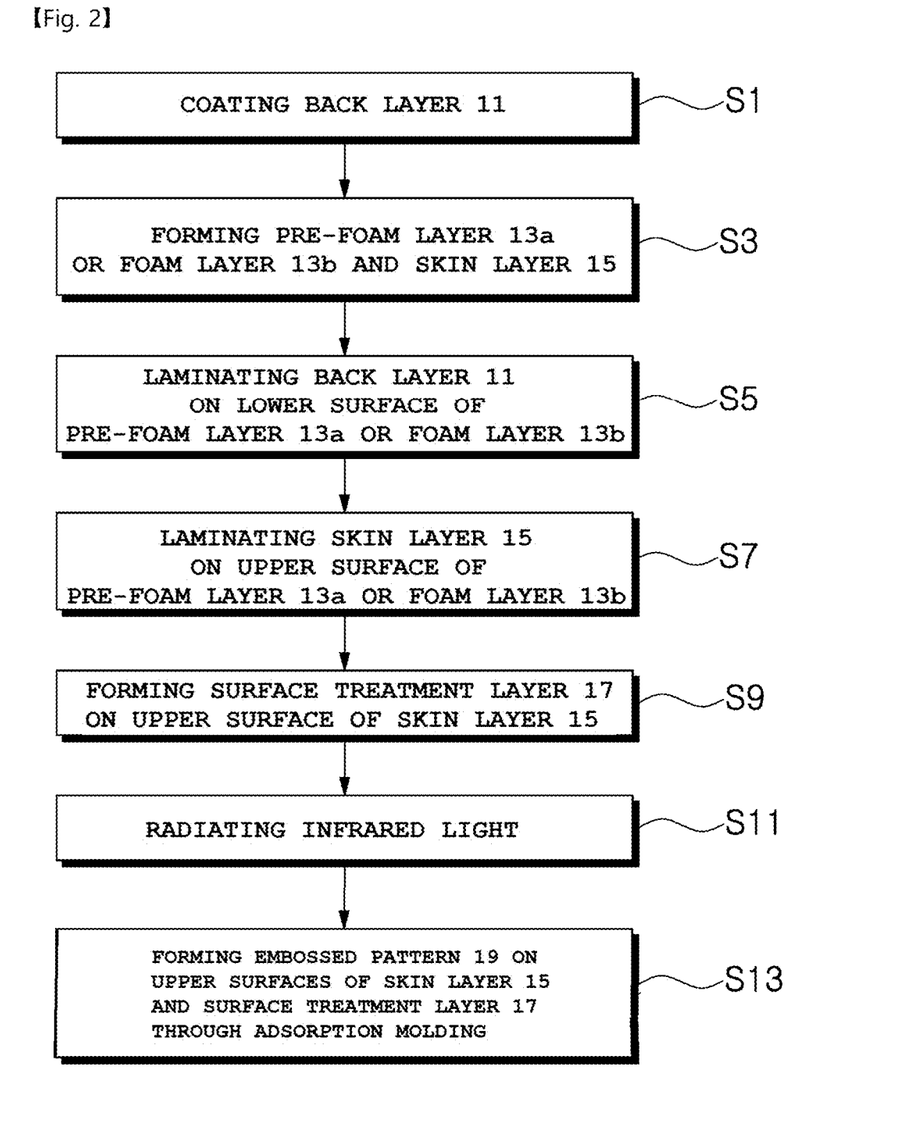
FIG. 2 is a flowchart showing a process of manufacturing artificial leather according to the present invention.

Referring to FIG. 2, the present invention relates to a method of manufacturing artificial leather, including:
- step S1 (back layer coating step) of coating one surface of a back layer formed of woven fabric or nonwoven fabric with a coating solution;
- step S3 (pre-foam layer or foam layer and skin layer forming step) of separately forming a pre-foam layer or foam layer and a skin layer by molding;
- step S5 (back layer lamination step) of laminating the back layer having one coated surface on the lower surface of the pre-foam layer or foam layer;
- step S7 (skin layer lamination step) of laminating the skin layer on the upper surface of the pre-foam layer or foam layer on which the back layer has been formed;
- step S9 (surface treatment layer-forming step) of coating the upper surface of the skin layer with a water-based surface treatment agent to form a surface treatment layer;
- step S11 (infrared light-radiating step) of irradiating the upper surface of the surface treatment layer with infrared light; and
- step S13 (embossing molding step) of forming an embossed pattern through vacuum adsorption molding on the upper surfaces of the skin layer and surface treatment layer heated by irradiation with infrared light.

Hereinafter, the method of the present invention will be described in detail stepwise.

Step S1 (Back Layer Coating Step)

In step S1, one surface of the back layer 11 may be coated with a coating solution to increase the peel strength between the back layer 11 and the foam layers 13b and 13b' formed on the upper surface of the back layer 11.

Specifically, according to the present invention, since an embossed pattern is formed through vacuum adsorption molding during step S13 (embossing molding step), high pressure is not applied to a semi-finished product as in the case of forming an embossed pattern using a conventional roller pressing-type embossing roller, and thus the peel strength between the back layer 11 and the foam layers 13b and 13b' may be reduced. Accordingly, in the present invention, to increase the peel strength between the back layer 11 and the foam layers 13b and 13b', the coating solution may be applied to one surface of the back layer 11, and then gelling of the coating solution may be performed by heating at 120 to 150° C.

The coating solution may be an acrylic adhesive, a polyurethane adhesive, or a polyvinyl chloride plastisol. However, since the acrylic adhesive becomes hard after drying, there is a disadvantage in that the microhardness of artificial leather is increased. In addition, since the polyurethane adhesive is expensive, material costs may be increased. Thus, the polyvinyl chloride plastisol, which is inexpensive and does not increase the microhardness of artificial leather after drying, may be used.

The polyvinyl chloride plastisol may be obtained by stirring 70 to 130 parts by weight of a plasticizer and 0.5 to 10 parts by weight of a curing agent based on 100 parts by weight of a polyvinyl chloride resin at room temperature.

Specifically, the polyvinyl chloride resin may be a mixed resin consisting of 60 to 90% by weight of a homopolymer of vinyl chloride and 10 to 40% by weight of a copolymer of vinyl chloride and vinyl acetate.

The vinyl chloride homopolymer is a paste polyvinyl chloride resin prepared using emulsion polymerization, and may be included in an amount of 60 to 90% by weight or 65 to 85% by weight in the mixed resin. When the content of the vinyl chloride homopolymer is below the above range, the peel strength between the back layer 11 and the foam layers 13b and 13b' may be reduced. When the content of the vinyl chloride homopolymer exceeds the above range, odor may be severe. Thus, the vinyl chloride homopolymer is preferably included in an amount within the above range.

The copolymer of vinyl chloride and vinyl acetate is a resin capable of providing strong adhesive force to the back layer 11 made of woven fabric or nonwoven fabric. The content of vinyl acetate included in the copolymer may be 1 to 15% by weight or 3 to 10% by weight. When the content of vinyl acetate is below the above range, adhesive force may be reduced, thereby reducing the peel strength between the back layer 11 and the foam layer 13b. When the content of vinyl acetate exceeds the above range, hydrolyzability may be degraded. Thus, vinyl acetate is preferably included in an amount within the above range.

In addition, the copolymer of vinyl chloride and vinyl acetate may be included in an amount of 10 to 40% by weight or 15 to 35% by weight in the mixed resin. When the content of the copolymer is below the above range, the peel strength between the back layer 11 and the foam layer 13b may be reduced. When the content of the copolymer exceeds the above range, mechanical properties such as heat resistance may be degraded. Thus, the copolymer is preferably included in an amount within the above range.

The plasticizer contained in the coating solution may include one or more selected from phthalate-based plasticizers, terephthalate-based plasticizers, benzoate-based plasticizers, citrate-based plasticizers, phosphate-based plasticizers, and adipate-based plasticizers.

In the present invention, eco-friendly and heat resistant terephthalate-based plasticizers are preferably used. For example, dioctyl terephthalate may be used as the terephthalate-based plasticizer, without being limited thereto.

The plasticizer may be included in an amount of 70 to 130 parts by weight or 80 to 120 parts by weight based on 100 parts by weight of the mixed resin. When the content of the plasticizer is below the above range, the viscosity of the coating solution may be increased, resulting in poor processability. When the content of the plasticizer exceeds the above range, adhesive force may decrease due to plasticizer transfer. Thus, the plasticizer is preferably included in an amount within the above range.

As the curing agent included in the coating solution, a low temperature curable curing agent may be used to increase energy efficiency and productivity. For example, a block isocyanate curing agent in which some or all of isocyanate groups are blocked with a blocking agent may be used as the curing agent.

The blocking agent may include one or more selected from the group consisting of phenol, s-caprolactam, methyl ethyl ketone oxime, 1,2-pyrazole, diethyl malonate, diisopropylamine, triazole, imidazole, and 3,5-dimethylpyrazole.

The block isocyanate curing agent blocks an isocyanate group (—NCO) to prevent the isocyanate group from reacting with a hydroxyl group (—OH) or an amino group (—NH) at room temperature, and when the temperature reaches a certain temperature range, a blocking agent is dissociated and the reactivity of the isocyanate group (—NCO) increases. As a result, curing reaction proceeds.

The dissociation temperature of the curing agent may be 100° C. or more or 110 to 130° C.

The curing agent may be included in an amount of 0.5 to 10 parts by weight or 1 to 5 parts by weight based on 100 parts by weight of the mixed resin. When the content of the curing agent is below the above range, due to decrease in a degree of crosslinking, the peel strength between the back layer 11 and the foam layers 13b and 13b' may be reduced. When the content of the curing agent exceeds the above range, the unreacted curing agent remains as impurities, thereby degrading usability. Thus, the curing agent is preferably included in an amount within the above range.

When necessary, the coating solution may further include one or more additives selected from the group consisting of stabilizers, fillers, pigments, viscosity lowering agents, and dispersants, and the content of the additives may be determined without limitation as long as the additives do not affect the physical properties of the coating solution.

When viscosity is measured at 25° C. using a Zahn cup (cup #3) viscometer, the viscosity of the coating solution may be 80 to 140 seconds or 100 to 120 seconds. When the viscosity of the coating solution is below the above range, the coating solution may flow down, thereby reducing coating efficiency. When the viscosity of the coating solution exceeds the above range, the coating solution aggregates upon coating, which prevents the coating solution from being impregnated into the back layer 11 made of woven fabric or nonwoven fabric. Thus, to ensure stable processability, the coating solution is preferably prepared to have a viscosity within the above range.

The back layer 11 coated with the coating solution serves to maintain the shape of the artificial leather and to prevent generation of wrinkles in the artificial leather, thereby improving mechanical properties. The back layer 11 may be formed of flexible polymers, such as woven fabric, nonwoven fabric, knitted fabric, plain weave, and spun-bonded fabric, made of various composites based on cotton, rayon, silk, polyolefins (e.g., polyethylene, polypropylene, etc.), nylon, polyesters, polyurethanes, and the like, and may optionally further include natural fiber and/or synthetic fiber.

Preferably, when the back layer 11 is formed, mechanical properties, such as strength, and flame retardant properties may be easily secured. The back layer 11 may be formed of woven fabric or nonwoven fabric including cotton or rayon and a polyester in a weight ratio of 30 to 40:60 to so that sewing performance is improved and a clean appearance is realized in relation to the foam layers 13b and 13b'.

When the content of the polyester exceeds the above range, flammability, covering properties, and workability may be degraded. When the content of the polyester is below the above range, mechanical properties may be degraded. Accordingly, the polyester is preferably included in a content within the above range.

For example, the thickness of the coating layer formed on the back layer 11 may be 1 to 10 μm or 2 to 5 μm. Here, when the thickness of the coating layer is measured, the depth of the coating solution impregnated into the back layer 11 is also included. When the thickness of the coating layer is below the above range, the peel strength between the back layer 11 and the foam layers 13b and 13b' may be reduced. When the thickness of the coating layer exceeds the above range, the microhardness of artificial leather may be increased, leading to loss of softness. Thus, coating is preferably performed so that the coating layer has a thickness within the above range.

When the back layer 11 is coated with the coating solution, the peel strength between the back layer 11 and the foam layers may be 2.5 to 6 kgf/30 mm or 2.5 to 5.5 kgf/30 mm. When the peel strength is below the above range, the foam layers 13b and 13b' may be easily peeled off from the back layer 11, which degrades the quality of artificial leather. When the peel strength exceeds the above range, microhardness may be increased, leading to loss of softness. Thus, the peel strength is preferably maintained within the above range.

In addition, the thickness of the back layer 11 may be 0.4 to 0.7 mm. When the thickness of the back layer 11 is below the above range, mechanical strength may be reduced. When the thickness of the back layer 11 exceeds the above range, the back layer 11 may be thicker than necessary, which increases material cost.

Step S3 (Pre-Foam Layer or Foam Layer and Skin Layer Forming Step)

Step S3 may be a step of extrusion molding or calendering molding a pre-foam layer 13a or a foam layer 13b and the skin layer 15.

In this case, extrusion molding may be a T-die extrusion process using a T-die extruder after separately melting a composition for preparing a pre-foam layer or a foam layer and a composition for preparing a skin layer in an extruder, and calendering molding may be a calendering process of separately kneading a composition for preparing a pre-foam layer or a foam layer and a composition for preparing a skin layer in a mixer and passing the compositions between calender rolls at 160 to 170° C.

Specifically, the pre-foam layer 13a is prepared in a sheet shape through extrusion molding or calendering molding, and then is foamed in step S8 (foam molding step) to be described later to form the foam layer 13b'. The pre-foam layer 13a may have a thickness of 0.2 to 0.35 mm or 0.25 to 0.3 mm.

In addition, the foam layer 13b is prepared in a sheet shape through extrusion molding or calendering molding, and foaming is completed by passing the foam layer 13b through an oven at 220 to 260° C. The foam layer 13b may have a thickness of 0.4 to 0.8 mm or 0.4 to 0.7 mm. When the thickness of the foam layer 13b is below the above range, cushioning may be degraded. When the thickness of the foam layer 13b exceeds the above range, the foam layer 13b may be thicker than necessary, which increases material cost.

More specifically, the pre-foam layer 13a or the foam layer 13b may be formed of a composition for preparing a pre-foam layer or a foam layer including 60 to 120 parts by weight of a plasticizer and 5 to 15 parts by weight of a foaming agent based on 100 parts by weight of a polyvinyl chloride resin.

Specifically, the polyvinyl chloride resin included in the pre-foam layer 13a or the foam layer 13b may be a straight polyvinyl chloride resin prepared by suspension polymerization that may secure excellent cushioning and durability and high elongation at the same time.

The polyvinyl chloride resin may have a degree of polymerization of 900 to 1,200 or 950 to 1,150. When the degree of polymerization is below the above range, durability may be degraded. When the degree of polymerization exceeds the above range, the hardness of the pre-foam layer 13a or the foam layer 13b may be increased, leading to decrease in cushioning. Thus, the polyvinyl chloride resin having a degree of polymerization within the above range is preferably used.

In addition, according to the present invention, to further increase the adhesion of the pre-foam layer 13a or the foam layer 13b to the back layer 11 positioned at the bottom, the pre-foam layer 13a or the foam layer 13b may further include a copolymer of vinyl chloride and vinyl acetate in an amount of 5 to 20 parts by weight or 5 to 15 parts by weight based on 100 parts by weight of the polyvinyl chloride resin. Within this range, the peel strength between the back layer 11 and the pre-foam layer 13a or the foam layer 13b may be excellent.

Vinyl acetate may be included in an amount of 0.5 to 10% by weight or 1 to 5% by weight in the copolymer of vinyl chloride and vinyl acetate.

Alternately, according to the present invention, the pre-foam layer 13a or the foam layer 13b may be formed of a mixed resin prepared by mixing the polyvinyl chloride resin with one or more selected from the group consisting of thermoplastic polyurethane (TPU) resins, polyvinylidene chloride (PVDC) resins, polyvinylidene fluoride (PVDF) resins, chlorinated polyvinyl chloride (CPVC) resins, polyvinyl alcohol (PVA) resins, polyvinyl acetate (PVAc) resins, polyvinylbutyrate (PVB) resins, polyethylene (PE) resins, and polypropylene (PP) resins.

The plasticizer may include one or more selected from phthalate-based plasticizers, terephthalate-based plasticizers, and epoxy-based plasticizers.

A plasticizer, which is very compatible with the polyvinyl chloride resin, may be used as the phthalate-based plasticizer, and may include one selected from the group consisting of dibutylphthalate, diethylhexylphthalate, diisononylphthalate, diisodecylphthalate, and butylbenzylphthalate. Preferably, diisodecylphthalate, which is a low-volatility plasticizer, is used as the phthalate-based plasticizer.

The terephthalate-based plasticizer may be an environmentally friendly plasticizer, e.g., dioctyl terephthalate, without being limited thereto.

The epoxy-based plasticizer may be obtained by epoxidizing a double bond in an unsaturated fatty acid glycerol ester with hydrogen peroxide or peracetic acid. For example, epoxidized soybean oil or epoxidized linseed oil may be used as the epoxy-based plasticizer, without being limited thereto.

The plasticizer may be included in an amount of 60 to 120 parts by weight or 70 to 100 parts by weight based on 100 parts by weight of the polyvinyl chloride resin. When the content of the plasticizer is below the above range, processability and ductility may be degraded and microhardness may be increased. When the content of the plasticizer exceeds the above range, bleeding of a plasticizer may occur. Thus, to implement excellent ductility, the plasticizer is preferably included in an amount within the above range.

Any materials capable of forming fine bubbles that impart elasticity and thickness to the foam layer 13b may be used as the foaming agent. For example, a chemical foaming agent, such as azodicarbonamide (ADCA), p,p'-oxybis(benzenesulfonyl hydrazide), p-toluenesulfonyl hydrazide, or sodium bicarbonate, may be used as the foaming agent.

The foaming agent may be included in an amount of 5 to 15 parts by weight or 5 to 10 parts by weight based on 100 parts by weight of the polyvinyl chloride resin. When the content of the foaming agent is below the above range, the ductility and cushioning of artificial leather may be degraded. When the content of the foaming agent exceeds the above range, an excess of foam cells may be generated in the foam layer 13b, thereby degrading surface physical properties and durability. Thus, the foaming agent is preferably used in an amount within the above range.

The foam layer 13b may have a foaming rate of 100 to 500% or 150 to 300%. Within this range, a sense of volume, cushioning, and smooth surface texture may be secured. When the foaming rate of the foam layer 13b is below the above range, the microhardness of artificial leather may be increased, thereby hardening the artificial leather. When the foaming rate of the foam layer 13b exceeds the above range, i.e., when foaming is excessively performed, the durability and strength of artificial leather may be weakened, thereby degrading physical properties. Thus, foaming is preferably performed so that the foam layer 13b has a foaming rate within the above range.

Foam cells formed in the foam layer 13b may be spherical foam cells. In this case, the spherical foam cells are contrasted with foam cells distorted by external pressure or foam cells having a pointy shape, and the spherical shape does not necessarily mean a geometrically perfect spherical shape. In general, when describing an individual foam cell as having a spherical shape, the spherical shape should be understood as a comprehensive concept. Accordingly, in the present specification, a spherical foam cell should be understood as a foam cell that does not deform due to external physical force and maintains a spherical shape during forming.

In addition, 10 to 30 or 15 to 20 foam cells per unit area of 1 mm$^2$ in the side cross section or the horizontal cross section of the foam layer 13b may be included. When the density of the foam cells is below the above range, ductility and cushioning may be degraded. When the density of the foam cells exceeds the above range, surface durability and physical properties, such as surface texture and cushioning, may be degraded. Thus, the foam cells are preferably formed at a density within the above range.

When the number of foam cells was measured, artificial leather was cut in the vertical direction or the horizontal direction, and the number of foam cells formed in a unit area of 1 mm$^2$ in the side cross section or the horizontal cross section of the foam layer 13b was measured using an optical microscope.

In addition, the foam cells may have an average diameter of 120 to 250 μm or 135 to 200 μm. Here, the average diameter refers to an average value of diameters that one foam cell may have. More specifically, when the foam cells are geometrically spherical, the average diameter means the average of diameters, and when the foam cells have a shape other than a spherical shape, the average diameter means the average length of long axes when a long axis and a short axis are divided.

When the foam cells have an average diameter within the above range and the foam cells maintain a spherical shape, the ductility, processability, and cushioning of the artificial leather may be improved.

When the average diameter of the foam cells was measured, artificial leather was cut in the vertical direction or the horizontal direction, and the average diameter of foam cells formed in a unit area of 1 mm$^2$ in the side cross section or the horizontal cross section of the foam layer 13b was measured based on the scale bar of an optical microscope.

In addition, the foam layer 13b may have a specific gravity of 0.7 to 0.9 or 0.7 to 0.8. When the specific gravity of the foam layer 13b is below the above range, durability may be degraded. When the specific gravity of the foam layer 13b exceeds the above range, ductility and cushioning may be degraded. Thus, the foam layer 13b preferably has a specific gravity within the above range.

That is, spherical foam cells in the foam layer 13b are not deformed by external pressure, 10 to 30 foam cells per unit area of 1 mm$^2$ in the side cross section or the horizontal cross section of the foam layer may be included, and the specific gravity of the foam layer may be 0.7 to 0.9. Accordingly, artificial leather having significantly improved cushioning and smooth surface texture may be implemented.

The skin layer 15 serves to secure surface smoothness and implement color, and may be formed of a composition for preparing a skin layer including 60 to 120 parts by weight of a plasticizer and a pigment based on 100 parts by weight of a polyvinyl chloride resin.

Preferably, the degree of polymerization of a polyvinyl chloride resin included in the skin layer 15 is higher than that of a polyvinyl chloride resin included in the pre-foam layer 13a or the foam layer 13b. Thereby, the skin layer 15 may be prevented from bursting during step S8 (foam molding step) or step S13 (embossing molding step) to be described later.

Specifically, a straight polyvinyl chloride resin prepared by suspension polymerization may be used as the polyvinyl chloride resin included in the skin layer 15.

The polyvinyl chloride resin included in the skin layer 15 may have a degree of polymerization of 1,250 to 3,000 or 1,250 to 2,000. When the degree of polymerization of the polyvinyl chloride resin is below the above range, the skin layer 15 may burst during step S8 (foam molding step) or step S13 (embossing molding step) to be described later. When the degree of polymerization of the polyvinyl chloride resin exceeds the above range, surface texture and ductility may be degraded. Thus, the polyvinyl chloride resin having a degree of polymerization within the above range is preferably used.

Since the plasticizer included in the composition for preparing the skin layer 15 is the same as the plasticizer included in the pre-foam layer 13a or the foam layer 13b, repeated description thereof will be omitted.

To adjust melt strength and physical properties, the pre-foam layer or foam layer and the composition for preparing a skin layer may further include one or more selected from the group consisting of heat stabilizers, flame retardants, and fillers, and the contents thereof are not particularly limited as long as the additives do not affect physical properties.

The skin layer 15 may have a thickness of 100 to 300 μm or 120 to 200 μm. When the thickness of the skin layer 15 is below the above range, surface smoothness and processability may be degraded, and the amount of pigment added to implement color may be increased, leading to increase in material cost. When the thickness of the skin layer 15 exceeds the above range, the cushioning of artificial leather may be degraded, and the skin layer 15 may be thicker than necessary, which increases material cost.

Step S5 (Back Layer Lamination Step)

Step S5 may be a step of thermally laminating the back layer 11 having one coated surface on the lower surface of the pre-foam layer 13a or the foam layer 13b.

Step S7 (Skin Layer Lamination Step)

Step S7 may be a step of thermally laminating the skin layer 15 on the upper surface of the pre-foam layer 13a or the foam layer 13b on which the back layer 11 has been laminated.

Specifically, when the back layer 11 having one coated surface is thermally laminated on the lower surface of the pre-foam layer 13a or the foam layer 13b, and then the skin layer 15 is laminated on the upper surface of the pre-foam layer 13a or the foam layer 13b on which the back layer 11 has been laminated, the mechanical strength of the back layer 11 may be excellent, and thus the physical properties of each layer may be ensured during a process.

When the skin layer 15 is first laminated on the pre-foam layer 13a or the foam layer 13b, bubbles may be generated in the two layers (13a/13b, 15) during thermal lamination or curling such as bending of a layer may occur. Thus, preferentially, the back layer 11 having excellent mechanical strength is thermally laminated on the lower surface of the pre-foam layer 13a or the foam layer 13b.

In addition, in step S7, when the pre-foam layer 13a is used, step S8 (foam molding step) of forming a semi-finished product, in which the back layer 11; the foam layer 13b'; and the skin layer 15 are laminated, by foaming the pre-foam layer 13a by passing the pre-foam layer 13a through an oven at 220 to 230° C. after step S7 may be further included.

In this case, the properties of the foam layer 13b' are the same as those of the foam layer 13b described above, and thus repeated description thereof will be omitted.

Step S9 (Surface Treatment Layer-Forming Step)

Step S9 may be a step of applying a water-based surface treatment agent to the upper surface of the skin layer of the semi-finished product and performing drying to form the surface treatment layer 17. In this case, coating may be performed to form a single layer or two or more layers.

The water-based surface treatment agent may be a two liquid-type water-based surface treatment agent including 1 to 25 parts by weight of a curing agent, 1 to 25 parts by weight of a water-based solvent, and 1 to 15 parts by weight of a silicon compound based on 100 parts by weight of a main material.

The main material may be a water-dispersed polycarbonate-based polyurethane resin, without being limited thereto.

The curing agent may include one or more functional groups selected from the group consisting of an aziridine group, an isocyanate group, and a carbodiimide group per molecule.

The silicon compound may be a polysiloxane of a liquid form dispersed in water or a polysiloxane of a bead form. Preferably, to improve surface texture, the silicon compound is a polysiloxane of a liquid form dispersed in water.

The water-based solvent may include water, an alcohol, or a mixture thereof.

For single-layer coating, the above-described water-based surface treatment agent may be applied. For multilayer-coating, the above-described water-based surface treatment agent excluding a silicon compound may be applied to a base, and the above-described water-based surface treatment agent may be applied to the upper surface of the base.

Drying may be performed at 110 to 150° C. or 130 to 150° C. for 80 to 120 seconds. When drying time and temperature are below the above ranges, a water-based solvent may not be completely evaporated, and curing may not proceed completely. As a result, whitening may occur on the surface of artificial leather, and surface physical properties may be degraded. When temperature exceeds the above range, heat resistance may be degraded, causing discoloration. Thus, drying is preferably performed within the above temperature range and the above time range.

Whitening, a type of color defect, refers to a phenomenon in which white dots appear on the surface of artificial leather after application of the water-based surface treatment agent.

The surface treatment layer 17 may have a thickness of 4 to 30 μm or 4 to 20 μm. Within this range, contamination resistance may be secured while maintaining the flexibility of artificial leather. When the thickness of the surface treatment layer 17 is below the above range, the surface treatment layer 17 becomes too thin, resulting in poor durability. When the thickness of the surface treatment layer 17 exceeds the above range, the amount of a water-based surface treatment agent to be added may be increased, thereby increasing material cost. Thus, the surface treatment layer 17 is preferably formed to have a thickness within the above range.

Step S11 (Infrared Light-Radiating Step)

Step S11 may be a step of radiating infrared light at 150 to 180° C. for 5 to 15 seconds or 10 to 15 seconds to the surface of the skin layer 15 of a semi-finished product on which the surface treatment layer 17 of step S9 is formed. When infrared light radiation temperature and time are below the above ranges, since the skin layer 15 is not softened, an embossed pattern may not be clearly formed in step S13 (embossing molding step) to be described later. When infrared light radiation temperature and time exceed the above ranges, the skin layer 15 may melt. Thus, infrared light radiation is preferably performed within the above ranges.

For example, in step S11, process speed may be 10 to 20 m/min or 12 to 15 m/min. Specifically, when process speed is 15 m/min, infrared light is radiated for 14 seconds.

Step S13 (Embossing Molding Step)

Step S13 may be a step of forming the embossed pattern 19 through vacuum adsorption molding, and may be performed under a vacuum pressure of 0.02 to 0.08 MPa or 0.04 to 0.07 MPa. When step S13 is performed under a vacuum pressure below the above range, the embossed pattern 19 may not be clearly formed, resulting in poor cushioning. When step S13 is performed under a vacuum pressure exceeding the above range, the surface treatment layer 17 may be damaged, or surface physical properties may be degraded. Thus, step S13 is preferably performed under a vacuum pressure within the above range.

In addition, step S13 may be performed at a temperature of 160 to 180° C. or 170 to 180° C. When step S13 is performed at a temperature below the above range, the embossed pattern 19 may not be sufficiently formed. When step S13 is performed at a temperature exceeding the above range, the surface physical properties of artificial leather may be degraded due to high temperature, and thus the surface thereof may be rough or torn. Thus, step S13 is preferably performed at a temperature within the above range.

In the method of manufacturing artificial leather according to the present invention, optionally, step S8 (foam molding step), step S9 (surface treatment layer-forming step), step S11 (infrared light-radiating step), and step S13 (embossing molding step) may be performed in an in-line manner.

In the artificial leather of the present invention, the thicknesses of portions of a surface treatment layer respectively formed on the valleys and crests of an embossed pattern may be uniform, thereby securing excellent surface appearance.

In addition, the artificial leather of the present invention may have a texture similar to that of natural leather and may have a soft feel similar to natural leather.

In addition, the artificial leather of the present invention may implement excellent cushioning by preventing foam cells constituting foam layers from being distorted or damaged.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

1. Preparation of Artificial Leather

Example 1

(1) Step S1 (Back Layer Coating Step)
1) Preparation of Coating Solution

Based on 100 parts by weight of a mixed resin consisting of 75% by weight of a homopolymer of paste vinyl chloride and 25% by weight of a copolymer of vinyl chloride and vinyl acetate (content of vinyl acetate: 6% by weight), a coating composition including 100 parts by weight of a plasticizer and 3 parts by weight of a curing agent was completely stirred at room temperature to prepare a coating solution having a Zahn cup (cup #3) viscosity of 100 seconds at 25° C.

2) One surface of woven fabric containing cotton and a polyester in a ratio of 35:65 was coated with the prepared coating solution using a gravure coating method to form a coating layer having a thickness of 3 μm, and gelling was performed by heating at 130° C. to form a back layer having a thickness of 0.6 mm.

(2) Step S3 (Pre-Foam Layer and Skin Layer Forming Step)

2-1) Calender Molding of Pre-Foam Layer 13a

Based on 100 parts by weight of a straight polyvinyl chloride resin having a degree of polymerization of 1,000, a composition for preparing a foam layer, the composition including 10 parts by weight of a copolymer of vinyl chloride and vinyl acetate (content of vinyl acetate: 3% by weight), 85 parts by weight of a plasticizer, 6 parts by weight of a foaming agent, and 2 parts by weight of a heat stabilizer was kneaded, and the kneaded raw materials were passed between calender rolls at 160 to 170° C. to form the pre-foam layer 13a having a thickness of 0.3 mm.

2-2) Calender Molding of Skin Layer 15

Based on 100 parts by weight of a straight polyvinyl chloride having a degree of polymerization of 1,300, a composition for preparing a skin layer, the composition including 95 parts by weight of a plasticizer, 2 parts by weight of a pigment, and 2 parts by weight of a heat stabilizer was kneaded, and the kneaded raw materials were passed between calender rolls at 160 to 170° C. to form a skin layer having a thickness of 150 μm.

(3) Step S5 (Back Layer Lamination Step)

The back layer 11 having one coated surface was thermally laminated on the lower surface of the pre-foam layer 13a.

(4) Step S7 (Skin Layer Lamination Step)

The skin layer 15 was thermally laminated on the upper surface of the pre-foam layer 13a on which the back layer 11 had been laminated.

(5) Step S8 (Foam Molding Step)

By passing a semi-finished product, in which the back layer 11; the pre-foam layer 13a; and the skin layer 15 were laminated, through an oven at 220° C., foaming of the pre-foam layer 13a was performed. As a result, a semi-finished product in which the back layer 11; the foam layer 13b'; and the skin layer 15 were laminated was manufactured.

(6) Step S9 (Surface Treatment Layer-Forming Step)

The surface of the skin layer 15 was coated, in an amount of 40 to 50 g/m², with a water-based surface treatment agent including 5 parts by weight of a curing agent, 20 parts by weight of a water-based solvent, and 5 parts by weight of a silicon compound based on 100 parts by weight of a polycarbonate-based polyurethane resin through gravure coating, and drying was performed at 140° C. to evaporate the water-based solvent. As a result, the surface treatment layer 17 having a thickness of 15 μm was formed.

(7) Step S11 (Infrared Light-Radiating Step) and Step S13 (Embossing Molding Step)

The surface of a semi-finished product, in which the back layer 11; the foam layer 13b'; the skin layer 15; and the surface treatment layer 17 were laminated from the bottom to the top, was irradiated with infrared light at 150 to 180° C. for 14 seconds to heat the surface of the semi-finished product to about 170° C., and then the embossed pattern 19 was formed on the surfaces of the skin layer 15 and the surface treatment layer 17 under a vacuum pressure of 0.06 MPa through vacuum adsorption molding. Through these steps, manufacture of the artificial leather of the present invention was completed.

Examples 2 to 10

The artificial leather manufactured in Example 1 was cut at arbitrary positions to prepare specimens for evaluating gloss difference in the valleys 19a and the crests 19b of the embossed pattern 19.

Comparative Example 1

Artificial leather was manufactured in the same manner as in Example 1, except that roll pressing was performed under a pressure of 4 MPa using embossing rolls having an embossing pattern to form an embossed pattern on the surface of the skin layer 15 after step S8 (foam molding step), and a water-based surface treatment agent was applied in the same amount as in Example 1 to the surface of the skin layer 15, on which the embossed pattern was formed, to form a surface treatment layer.

Comparative Examples 2 to 10

The artificial leather manufactured in Comparative Example 1 was cut at arbitrary positions to prepare specimens for evaluating gloss difference in the valleys 19a and the crests 19b of the embossed pattern 19.

2. Measurement of Thickness of Surface Treatment Layer of Artificial Leather

The artificial leather of Example 1 and Comparative Example 1 was cut in the vertical direction, and the thicknesses of portions of a surface treatment layer respectively formed on each valley and each crest of an embossed pattern were measured using a high magnification optical microscope. The results are shown in Table 1 below.

TABLE 1

| | Example 1 | Comparative Example 1 |
|---|---|---|
| Thickness of portion of surface treatment layer formed on valley of embossed pattern (μm) | 15 | 15 |
| Thickness of portion of surface treatment layer formed on crest of embossed pattern (μm) | 15 | 10 |

As shown in Table 1, in the case of the artificial leather of Example 1 according to the present invention, the thicknesses of portions of a surface treatment layer respectively formed on each valley and each crest of an embossed pattern are the same, showing a thickness of 15 μm, and a ratio of the thickness of a portion of the surface treatment layer formed on a crest of the embossed pattern to the thickness of a portion of the surface treatment layer formed on a valley of the embossed pattern is 1, satisfying a specific range of 0.7 to 1. Gloss difference in the surface treatment layer is small, and the artificial leather of Example 1 does not appear mottled. These results indicate that the artificial leather of Example 1 has excellent surface appearance. On the other hand, in the case of the artificial leather of Comparative Example 1, the thicknesses of portions of a surface treatment layer respectively formed on each valley and each crest of an embossed pattern are quite different, showing a difference of 5 μm, and a ratio of the thickness of a portion of the surface treatment layer formed on a crest of the embossed pattern to the thickness of a portion of the surface treatment layer formed on a valley of the embossed pattern is 0.6. Gloss difference in the surface treatment layer is large, and the surface of the artificial leather is mottled.

3. Measurement of Physical Properties of Artificial Leather (1) For the artificial leather specimens of Examples 2 to 10 and Comparative Examples 2 to 10, surface appearance was evaluated according to difference in gloss of portions of the surface of an artificial leather specimen respectively formed on the valleys 19a and the crests 19b of the embossed pattern 19, and the results are shown in Table 2 below.

—Surface appearance was evaluated based on the opinions of a panel consisting of 10 evaluators. When five or more evaluators said there was difference in gloss, it was evaluated that there was difference in gloss, which was marked by "X (poor appearance)". When less than five evaluators said there was difference in gloss, it was evaluated that there was no difference in gloss, which was marked by "○ (excellent appearance)".

—Peel Strength

The manufactured artificial leather was cut to obtain specimens having a width of 30 mm and a length of 150 mm. Five specimens were selected for each of the transverse and longitudinal directions. The bubble side of the specimen was impregnated with a solvent such as methyl ethyl ketone (MEK), and a skin (foam layer) and bubbles (back layer) were forcibly peeled off by 50 mm in parallel with the short side while taking care not to apply stress to the skin (foam layer).

After peeling, the specimen was allowed to stand at room temperature for 2 hours or more to volatilize the solvent sufficiently, the peeled skin (foam layer) and bubbles (back layer) were respectively fixed in the clamp of a tensile tester, and then a load at the time of peeling by 50 mm at 200 mm/min was calculated as the average value of maximum values.

Test results were averaged for five specimens.

—Ductility

Ductility (softness) was measured at a temperature of 23±2° C. and a relative moisture of 50±5% Five artificial leather specimens having a pi (n) value of 100 mm were

TABLE 2

| | Example 2 | Example 3 | Example 4 | Example 5 | Example 6 | Example 7 | Example 8 | Example 9 | Example 10 |
|---|---|---|---|---|---|---|---|---|---|
| Number of evaluators who said there was difference in gloss | 1 | 0 | 0 | 0 | 1 | 0 | 0 | 0 | 0 |
| Surface appearance | ○ | ○ | ○ | ○ | ○ | ○ | ○ | ○ | ○ |

| | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|
| Number of evaluators who said there was difference in gloss | 9 | 10 | 9 | 9 | 9 | 10 | 10 | 9 | 9 |
| Surface appearance | X | X | X | X | X | X | X | X | X |

As shown in Table 2, compared to the conventional artificial leather of Comparative Examples 2 to 10, in which an embossed pattern is formed through roller pressing, and then a surface treatment agent is applied, in the case of the artificial leather of Examples 2 to 10 according to the present invention, there is no difference in gloss between valleys and crests, or difference in gloss between valleys and crests is negligible. These results indicate that the artificial leather according to the present invention has surface appearance superior to the artificial leather of Comparative Examples.

(2) The microhardness, peel strength, ductility (softness), aesthetics (feel), and firmness of the artificial leather manufactured in Example 1 and Comparative Example 1 were measured, and the results are shown in Table 3 below.

—Microhardness

When microhardness is measured, a maximum value is measured immediately after a needle is brought into contact with artificial leather at an indentation speed of 1 mm/s in a peak hold mode using a microhardness tester (Micro durometer, Model name: MD-1 capa, Brand: ASKER), i.e., when the load holding time of the needle is 1 second.

prepared using a ductility measurement apparatus (SDL Atlas, ST300D), and the specimens were pressed with a ST300D apparatus and the degree of movement of a scale for 15 seconds was recorded. Based on these results, ductility was determined.

—Aesthetics (Feel)

Experts touched artificial leather with their hands and evaluated relative softness.

(⊙: very soft, ○: soft, Δ: not soft)

—Firmness

Artificial leather specimens having a width of 250 mm and a length of 200 mm were prepared. Five specimens were selected for each of the transverse and longitudinal directions. The specimen was placed on a horizontal plane so that the short side of the specimen was aligned with a SCALE baseline A.

Subsequently, the specimen was pressed with a pressing plate of the same size as the specimen and the specimen was slipped at a speed of 10 mm/second in the direction of the inclined surface. When one end of the specimen was in contact with the inclined surface, a position B of the other end was measured by a scale.

Firmness was represented by a moving distance (scale of B point) (mm). Firmness of the front and back sides of the specimens for the transverse and longitudinal directions was measured, and average values were calculated.

TABLE 3

|  | Example 1 | Comparative Example 1 |
|---|---|---|
| Microhardness | 54 | 66 |
| Peel strength [kgf/30 mm] | 3 | 3 |
| Ductility (softness) | 3.8 | 3.3 |
| Aesthetics (feel) | ◎ | Δ |
| Firmness (mm) | 52 | 76 |

As shown in Table 3, it can be confirmed that, compared to the artificial leather of Comparative Example 1 having an embossed pattern formed through roller pressing rather than vacuum adsorption, the artificial leather of Example 1 according to the present invention has low microhardness, high ductility, and a soft feel. These results indicate that the artificial leather of Example 1 is excellent in aesthetics. In addition, it can be confirmed that, compared to the artificial leather of Comparative Example 1, the artificial leather of Example 1 according to the present invention has low firmness. This result indicates that the artificial leather of Example 1 has high flexibility.

4. Measurement of Size, Number, and Shape of Foam Cells in Foam Layer of Artificial Leather The artificial leather manufactured in Example 1 and Comparative Example 1 was cut in the vertical direction, and the size (average diameter), number, and shape of foam cells included in the side cross section of a foam layer were measured, and the results are shown in Table 4.

When the size (average diameter) of the foam cells was measured, artificial leather was cut in the vertical direction, and the average diameter of foam cells formed in a unit area of 1 mm² in the side cross section of the foam layer 13b' was measured using a scale bar of an optical microscope.

When the number of the foam cells was measured, artificial leather was cut in the vertical direction, and the number of foam cells formed in a unit area of 1 mm² in the side cross section of the foam layer 13b' was measured using an optical microscope.

TABLE 4

|  | Example 1 | Comparative Example 1 |
|---|---|---|
| Foam cell size (μm) | 135-200 | 100-400 |
| Foam cell number (ea/mm²) | 15-20 | 5-10 |
| Foam cell shape | Spherical shape | Irregular shape |
| Thickness of foam layer (mm) | 0.5 | 0.3 |

As shown in the Table 4, in the artificial leather of Example 1 according to the present invention, an embossed pattern is formed using calender molding and vacuum. Accordingly, even after embossing molding, the spherical shape of foam cells in a foam layer may be maintained. In addition, an average diameter of foam cells is 135 to 200 μm, and the number of foam cells in the side cross section of a foam layer is 15 to 20 ea/mm². These results indicate that the artificial leather of Example 1 is light, and has excellent cushioning and aesthetics and high ductility. On the other hand, in the artificial leather of Comparative Example 1, an embossed pattern is formed through roller pressing. Accordingly, the shape of foam cells is elongated or distorted, the size and number of foam cells is small, and a foam layer is thin. Thus, in terms of cushioning, ductility, and aesthetics, the artificial leather of Comparative Example 1 is inferior to the artificial leather of Example 1.

5. Transfer Efficiency of Embossed Pattern

When the transfer efficiency of the embossed pattern of the artificial leather of Example 1 and Comparative Example 1 was measured, the artificial leather of Comparative Example 1, in which an embossed pattern is formed through embossing molding using a roll pressing-type embossing molding apparatus, exhibited a transfer efficiency of 80 to 90%. On the other hand, the artificial leather of Example 1 according to the present invention, in which an embossed pattern is formed through embossing molding using a vacuum embossing molding apparatus, exhibited a transfer efficiency of almost 100%.

[Description of Symbols]

10: ARTIFICIAL LEATHER
11: BACK LAYER
13A: PRE-FOAM LAYER
13B, 13B': FOAM LAYERS
15: SKIN LAYER
17: SURFACE TREATMENT LAYER
19: EMBOSSED PATTERN
19A: VALLEYS OF EMBOSSED PATTERN
19B: CRESTS OF EMBOSSED PATTERN

The invention claimed is:

1. Artificial leather, wherein a ratio of thickness of a portion of a surface treatment layer formed on a crest of an embossed pattern to thickness of a portion of the surface treatment layer formed on a valley of the embossed pattern is 0.7 to 1,
   wherein the artificial leather comprises a back layer, a foam layer, a skin layer, and the surface treatment layer laminated from bottom to top,
   wherein the embossed pattern is formed on upper surfaces of the skin layer and the surface treatment layer,
   wherein the embossed pattern is formed through vacuum adsorption molding under a vacuum pressure of 0.02 to 0.08 MPa on the upper surfaces of the skin layer and the surface treatment layer after the surface treatment layer has been heated by irradiation with infrared light,
   wherein the foam layer is formed using a composition comprising 60 to 120 parts by weight of a plasticizer and 5 to 15 parts by weight of a foaming agent based on 100 parts by weight of a first polyvinyl chloride resin, wherein the first polyvinyl chloride resin is a straight polyvinyl chloride resin having a degree of polymerization of 950 to 1,150,
   wherein the skin layer is formed using a composition comprising 60 to 120 parts by weight of a plasticizer and a pigment based on 100 parts by weight of a second polyvinyl chloride resin, wherein the second polyvinyl chloride resin has a degree of polymerization of 1,250 to 2,000,
   wherein the foam layer has 15 to 20 foam cells per unit area of 1 mm² in a side cross section or a horizontal cross section of the foam layer when the artificial leather is cut in the vertical direction or the horizontal direction and then the number of foam cells formed in a unit area of 1 mm$^2$ in the side cross section or the horizontal cross section of the foam layer is measured using an optical microscope, wherein the back layer is formed of woven fabric or nonwoven fabric, wherein the woven fabric or nonwoven fabric includes cotton or rayon, and a polyester in a weight ratio of 30 to 40:60 to 70, wherein the back layer is coated with a coating solution onto its one surface facing the foam layer, wherein the coating solution includes 70 to 130 parts by weight of a plasticizer and 0.5 to 10 parts by weight of a curing agent based on 100 parts by weight of a third polyvinyl chloride resin, wherein the third polyvinyl chloride resin is a mixed resin consisting of 60 to 90% by weight of a homopolymer of vinyl chloride and 10 to 40% by weight of a copolymer of vinyl chloride and vinyl acetate, and wherein the surface treatment layer is formed with a two liquid-type water-based surface treatment agent including 1 to 25 parts by weight of a curing agent, 1 to 25 parts by weight of a water-based solvent, and 1 to 15 parts by weight of a silicon compound based on 100 parts by weight of a water-dispersed polycarbonate-based polyurethane resin.

2. The artificial leather according to claim 1, wherein a thickness difference between portions of the surface treatment layer respectively formed on the valley and the crest of the embossed pattern is less than 5 μm.

3. The artificial leather according to claim 1, wherein areas where the ratio of thickness of the portion of the surface treatment layer formed on the crest of the embossed pattern to the thickness of the portion of the surface treatment layer formed on the valley of the embossed pattern is 0.7 to 1 occupy 80% or more of a total surface of the artificial leather.

4. The artificial leather according to claim 1, wherein the artificial leather has a microhardness of 45 to 59, wherein the microhardness is a maximum value measured immediately after a needle is brought into contact with the artificial leather at an indentation speed of 1 mm/s in a peak hold mode using a microhardness tester, when a load holding time of the needle is 1 second.

5. The artificial leather according to claim 1, wherein the water-based solvent includes water, an alcohol, or a mixture thereof.

* * * * *